United States Patent [19]

Hatakeyama et al.

[11] Patent Number: 4,838,582
[45] Date of Patent: Jun. 13, 1989

[54] FLEXIBLE EXPANSION PIPE COUPLING

[75] Inventors: Ryoichi Hatakeyama, Urawa; Shintaro Ikeda, Funabashi, all of Japan

[73] Assignee: The Victaulic Company of Japan, Ltd., Tokyo, Japan

[21] Appl. No.: 130,465

[22] Filed: Dec. 9, 1987

Related U.S. Application Data

[63] Continuation of Ser. No. 780,022, Sep. 25, 1985, abandoned.

[30] Foreign Application Priority Data

Sep. 26, 1984 [JP] Japan .................... 59-144311[U]

[51] Int. Cl.⁴ .................................................. F16L 17/06
[52] U.S. Cl. ........................... 285/110; 285/231; 285/369; 285/379; 277/207 A
[58] Field of Search .............. 285/110, 111, 113, 231, 285/379, 380, 351, 369, 223, 232; 277/207 A

[56] References Cited

U.S. PATENT DOCUMENTS

| | | | |
|---|---|---|---|
| 2,576,860 | 11/1951 | Shapiro | 285/231 |
| 2,914,345 | 11/1959 | Osborn | 277/207 A |
| 2,950,130 | 8/1960 | Schneider | 285/111 |
| 3,127,196 | 3/1964 | Fabian, Jr. et al. | 285/379 |
| 3,134,613 | 5/1964 | Regan | 285/111 |
| 3,186,741 | 6/1965 | Kurtz | 285/111 |
| 3,217,092 | 11/1965 | Sakurada | 285/231 |
| 3,362,729 | 1/1968 | Hendriks | 285/369 |
| 3,386,745 | 6/1968 | Hein | 277/207 A |
| 3,576,329 | 4/1971 | Weaver | 285/231 |
| 3,730,562 | 5/1973 | Viazzi | 285/110 |
| 3,899,183 | 8/1973 | Wild et al. | 277/207 A |
| 4,034,994 | 7/1977 | Ohta et al. | 285/379 |
| 4,036,512 | 7/1977 | Francis | 285/369 |
| 4,158,461 | 6/1979 | Francis | 285/111 |
| 4,170,365 | 10/1979 | Haaland | 285/231 |
| 4,223,895 | 9/1980 | Roberts | 277/207 A |
| 4,343,480 | 8/1982 | Vassallo | 285/110 |
| 4,361,336 | 11/1982 | Reeh | 285/231 |
| 4,438,954 | 3/1984 | Hattori | 285/111 |
| 4,529,211 | 7/1985 | Rodger | 277/207 A |

FOREIGN PATENT DOCUMENTS

| | | | |
|---|---|---|---|
| 167534 | 10/1953 | Australia | 285/111 |
| 263465 | 7/1968 | Austria | 285/110 |
| 660631 | 4/1963 | Canada | 285/231 |
| 1046963 | 12/1958 | Fed. Rep. of Germany | 285/110 |
| 1083092 | 6/1960 | Fed. Rep. of Germany | 785/110 |
| 0631120 | 12/1927 | France | 285/110 |
| 1520255 | 4/1968 | France | 285/111 |
| 6412035 | 7/1965 | Netherlands | 285/110 |
| 6508182 | 1/1966 | Netherlands | 285/110 |
| 466652 | 1/1969 | Switzerland | 285/111 |
| 105651 | 4/1917 | United Kingdom | 285/111 |
| 1165431 | 10/1969 | United Kingdom | 285/111 |
| 1315190 | 4/1973 | United Kingdom | 285/379 |
| 2172681 | 9/1986 | United Kingdom | 285/110 |

*Primary Examiner*—Gary L. Smith
*Assistant Examiner*—Eric K. Nicholson
*Attorney, Agent, or Firm*—Birch, Stewart, Kolasch & Birch

[57] ABSTRACT

A coupling is made up of annular resilient packing members having on their peripheral surfaces, a sleeve having flanges secured to opposite ends of the sleeve, and annular projections formed on the inner surface of the sleeve. When the packing members are inserted between the sleeve and pipes to be connected together, the projections are received in the grooves. The opposing ends of the packing members are respectively provided with pairs of lips. Before insertion, each pair of lips are separated away by a distance between the sleeve and the pipe, so that when each packing member is inserted the distance between the lips is decreased so that lips firmly engage the sleeve and pipes thus forming a resilient seal. As a consequence the coupling is flexible and can move relative to the pipes.

6 Claims, 2 Drawing Sheets

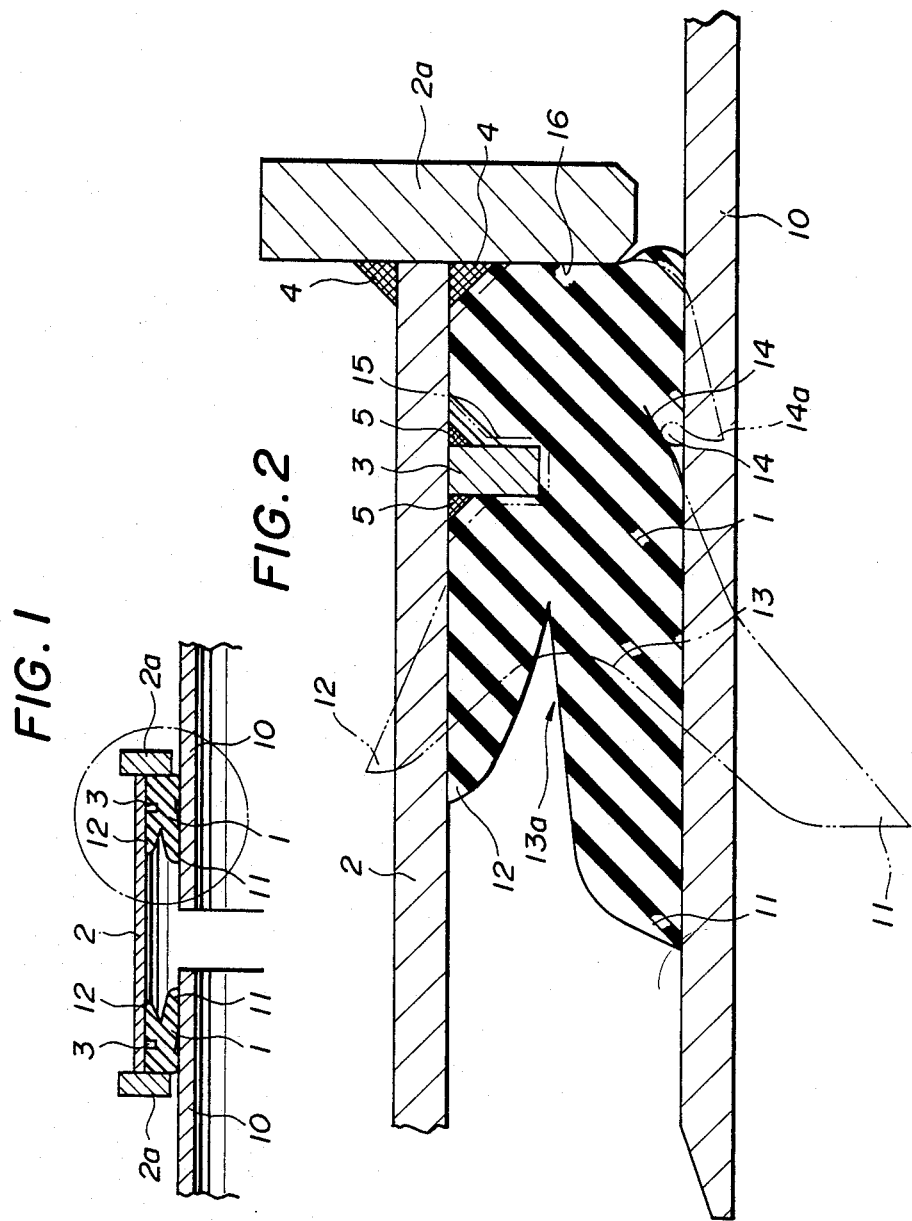

FLEXIBLE EXPANSION PIPE COUPLING

This application is a continuation, of application Ser. No. 780,022 filed on Sept. 25, 1985, now abandoned.

BACKGROUND OF THE INVENTION

The present invention relates to a flexible expansion pipe coupling.

According to the prior art flexible expansion pipe couplings a recess is formed in a coupling housing, and a packing is pushed into the housing from its rear side to be received by the recess for forming a seal between the packing and a pipe to be connected with the housing.

With this prior art construction, however, since the recess which is adapted to receive and hold the packing is required to have a substantial depth, the housing becomes bulky. Consequently, regardless of the fact that the cross-sectional area of the packing is small, the housing becomes bulky and the number of component parts increases. Moreover, since the packing is small, the follow up characteristic to the deformation of the pipes to be connected is not sufficient. Moreover, the assembling operation of the coupling is complicated and expensive. In addition, at the time of clamping the housing or at the time of flexure of the pipe after clamping, the packing would be damaged by being compressed between the housing and the pipes.

SUMMARY OF THE INVENTION

It is an object of the present invention to provide a flexible expansion coupling made up of a small number of component parts, capable of being readily assembled and having a large follow up characteristic to the deformation of the pipes to be connected, despite the large cross-sectional area of a packing as well as the excellent flexibility and eccentric absorption characteristics. According to the present invention there is provided a flexible coupling comprising annular resilient coupling members having grooves on their peripheral surfaces, a sleeve, flanges secure to the opposite ends of the sleeve, and annular projections provided for the inner surface of the sleeve, the annular projections being received in the grooves of respective packing members when they are inserted between the sleeve and a pair of pipes to be interconnected by the coupling until the bottoms of the packing members are urged against the flanges.

Each of the opposing ends of the packing members are provided with a pair of lips. Before inserting the packing member, the distance between the lips is larger than the distance between the sleeve and the pipe so that when the packing member is inserted, the distance between the lips is decreased whereby the lips firmly engage the pipe and sleeve to form flexible seals.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a longitudinal sectional view showing the general construction of the coupling according to the present invention;

FIG. 2 is an enlarged view showing the righthand end of the coupling shown in FIG. 1; and FIGS. 3 and 4 are longitudinal sectional views showing other embodiments of the present invention in which FIG. 4 shows an assembled state of the coupling in which pipes to be interconnected are inserted into the coupling.

DESCRIPTION OF THE PREFERRED EMBODIMENTS

Figure 3:
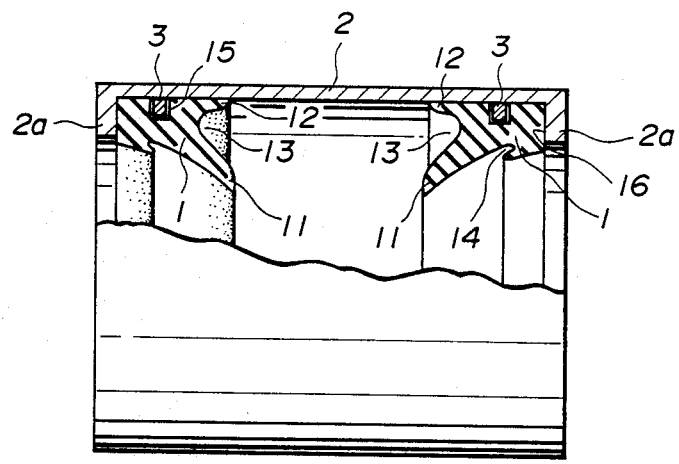

The embodiment of the present invention as shown in FIGS. 1 and 2 provides a short sleeve or housing 2 and flanges 2a welded to the opposite ends of the sleeve 2 as shown by welds 4, with the flanges abutting the bottoms 16 of packings 1. Annular projections 3 are welded to the inner wall of the sleeve 2 as shown by welds 5. When each packing 1 made of resilient material is inserted until its bottom 16 comes to abut against flange 2a, the projection 3 is recieved in an annular groove 15 provided at the outer periphery of the packing 1. The front or top end of each packing 1 is provided with lips 11 and 12. Before insertion, the lips 11 and 12 are biased open as shown by the dot and dash lines in FIG. 2 due to the resiliency of the packing. Another recess 14 is formed on the inner surface of the packing 1 at a point opposing the groove 15. When each packing 1 is inserted between a pipe 10 and the sleeve 2, the distance between the lips 11 and 12 is decreased as shown by the solid lines so that the lips 11 and 12 are urged against the outer surface of pipe 10 and the inner surface of sleeve 2 thus forming an efficient seal. At this time the recess 14 is reduced so that its edge 14a also forms a seal. In its non inserted state the groove 15 has a substantially larger size than the annular projection thus permitting easy insertion of the packing 1. However, after insertion of the packing as shown in FIG. 2, the groove 15 is compressed against projection 13. As a consequence, even when pipe 10 slides in the axial direction relative to sleeve 2, the packing is positively secured by sleeve 2 and flange 2a.

Although in the illustrated example the flanges 2a are welded to the opposite ends of the sleeve 2, the sleeve 2 and the flanges 2a can be integrally formed by extruding steel or aluminum. Instead of welding the projection 3 to sleeve 2, these parts can be formed integrally by extrusion. When extrusion is used the sleeve 2 can be formed by axially welding a metal plate bent to have a circular cross-section.

Figure 4:
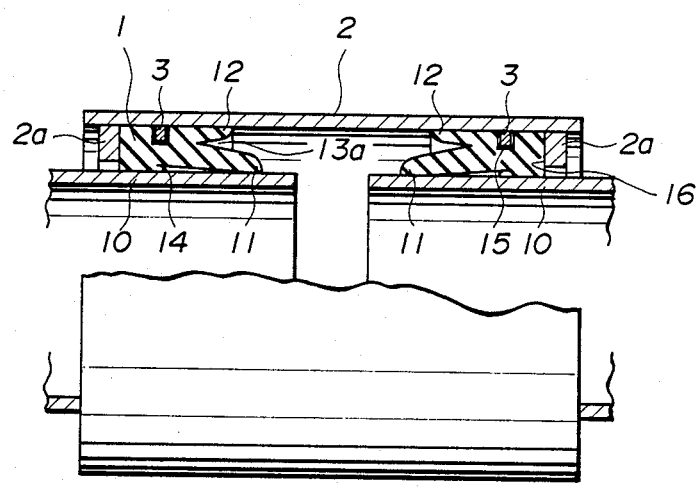

Instead of welding the flanges 2a to the opposite ends of sleeve 2 as shown in FIG. 2, the flanges can be formed by bending inwardly the opposite ends of the sleeve as shown in FIG. 3. Further, as shown in FIG. 4, the flanges 2a can be secured to the inner surface of sleeve 2 at points slightly inside of the ends of sleeve 2. With the modifications shown in FIGS. 3 and 4 the outer surface of the sleeve becomes smooth thus making easy the handling of the sleeve.

As above described, according to the present invention as a projection 3 is provided for the inner side of sleeve 2 to be received in a groove 15 provided for each packing, the packing can be positively held. Thus, different from the prior art construction in which an accommodating member of a size to entirely accommodate the packing, the accommodating member constituted by the end of sleeve 2, projection 3 and flange 2a has a size for accommodating only a portion of the packing. Even with such simplified construction, it is possible to securely hold a packing having a relatively large cross-section by using a more simple and compact sleeve than the prior art sleeve. This construction improves the follow up characteristic to deformations of the sleeve and the pipes to be interconnected while maintaining a positive sealing property. Accordingly, the dimensional accuracy of the component parts of the coupling is not critical, thus making easy the manufacturing and assembling of the component parts. Moreover, when attaching the pipes, no bolt is necessary. Further, the coupling of this invention can cope with bending and eccentricity of the pipes.

What is claimed is:

1. A flexible expansion coupling comprising:
  a first pipe member having an outer surface;
  a second pipe member having an outer surface;
  a sleeve member provided with flange members disposed at the opposite ends thereof, said sleeve member containing annular projecting members extending from an inner surface thereof, said sleeve member having first and second ends, said first end being positionable around the first pipe member and said second end being positionable around the second pipe member simultaneously therewith; and
  a plurality of packing members made of a resilient material, a first one of said packing members being positioned adjacent the first end of said sleeve member and a second one of said packing members being positioned adjacent the second end of said sleeve member, each of said packing members containing annular grooves on an outer side thereof for receiving one of said projecting members, each of said packing members including a pair of lips, each of said lips having an end portion, said end portions being space apart by a distance greater than the distance between the inner surface of said sleeve member and the outer surface of the pipe members before the packing members are inserted between said sleeve member and said first and second pipe members,
  a first one of said pair of lips of each of said packing members being in contact with the inner surface of said sleeve member and out of contact with the outer surface of said pipe member while a second one of said pair of lips is in contact with the outer surface of the said pipe member and out of contact with the inner surface of said sleeve member when said packing members are inserted between said sleeve member and said first and second pipe members for forming a primary seal,
  each of said packing members having a single recess on an inner side thereof, each of said single recesses being positioned at a point in said packing member opposite said annular groove, said inner side of each of said packing members being unbroken except for said single recess and being substantially flat except for said single recess when said packing member is inserted between said sleeve member and said pipe member,
  each of said packing members further having a rearward edge adjacent said single recess, said rearward edge of each of said packing members pointing generally in the direction of the pair of lips for the packing member, each of said rearward edges contacting one of the pipe members when said packing member is inserted between the sleeve member and the one pipe member and being compressed upon contacting the pipe member for forming a secondary seal therewith.

2. The flexible expansion coupling of claim 1 wherein the flange members are disposed at the ends of said sleeve member and substantially perpendicular thereto.

3. The coupling as set forth in claim 1 wherein said sleeve member has a longitudinal axis and wherein an end portion of the first one of said lips of each of said packing members extends beyond the axis of said sleeve member before insertion of said sleeve member over said packing member so that when said packing members are inserted between said sleeve member and said pipe member, the diameter of each of said first one of said lips decreases to form the primary seal between said first one of said lips and said pipe member.

4. The coupling as set forth in claim 1 wherein said flanges are welded to the opposite ends of said sleeve member.

5. The coupling as set forth in claim 1 wherein said flanges are secured to an inner surface of said sleeve member on opposite ends thereof.

6. The coupling as set forth in claim 1 wherein said flanges are formed by bending the opposite ends of said sleeve inwardly and radially.

* * * * *